INVENTOR.
RICHARD H. COLWILL
BY
Frank H. Cullen
ATTORNEY

Oct. 15, 1968 R. H. COLWILL 3,405,637

ROTARY RIBBON PRINTER

Filed March 30, 1966 4 Sheets-Sheet 2

Oct. 15, 1968 R. H. COLWILL 3,405,637

ROTARY RIBBON PRINTER

Filed March 30, 1966 4 Sheets-Sheet 3

United States Patent Office 3,405,637

Patented Oct. 15, 1968

3,405,637

ROTARY RIBBON PRINTER

Richard H. Colwill, Victor, N.Y., assignor to Burroughs Corporation, Detroit, Mich., a corporation of Michigan Filed Mar. 30, 1966, Ser. No. 538,645
4 Claims. (Cl. 101—244)

This invention relates to an apparatus for recording information on a record sheet, and particularly to a machine for recording information which can be read by automatic recognition equipment as well as by a human being. Such information is commonly used to encode checks and bank documents with bank transit numbers, account numbers, amounts, serial numbers, etc.

The art of printing characters in magnetic ink which may be read by magnetic ink character recognition equipment for automatic data processing has developed along the following line: certain fixed information is applied to the document by letterpress printing or offset lithography. Type must be set or plates must be prepared with such fixed information, and the printing process is ordinary, except that the ink used must contain a proportion (of the order of 60% or more) of magnetizable material of a very small size. The vehicle for such printing inks is a polymerizable varnish base, of the same sort that has been used in printing inks for many years. When the document is not completely encoded, information must be added later. This is usually done by means of an item encoder having settable characters, and may be accomplished with a machine such as is shown in Monticello et al. U.S. Patent No. 3,018,721, issued Jan. 30, 1962, and assigned to the same assignee as this application.

The standards of printing for documents used in automatic document processing systems are much higher than those which are to be read by human beings only. Character shapes and tolerances, the registration and alignment of the characters, the intensity and uniformity of the magnetic ink, the absence of voids and extraneous ink, the character spacing, and embossment of the document all must be maintained within very accurate limits in order to insure that a document will be read by automatic machinery without error.

An object of the present invention is to provide an improved ribbon printer for encoding documents in high quality printing of characters, which documents are used in mechanized information handling systems.

Another object of the invention is to eliminate the inking of printing type members in high quality character recognition printing systems.

A further object is to provide an improved ribbon printer which utilizes substantially all of the transfer area of a transfer ribbon, regardless of the spacing of the printed fields on a document. Such object is accomplished by advancing the ribbon for the amount of print only while the print member is in contact with the advancing document and ribbon as the printing is accomplished.

Another object of this invention is to provide a printing couple and arrangement which will accomplish magnetic ink transfer to a document and yield a print perfectly uniform and identical whether the transfer is accomplished at less than 30 cycles per minute or in excess of 1,000 cycles per minute.

Briefly, this invention includes a printing apparatus which prints through a transfer ribbon, which may be conveniently of either film or paper, wherein the transfer coating is substantially entirely transferred to the document. This invention is illustrated in conjunction with a rotary letter-press type of printing machine, in which a type member is brought into contact with the transfer ribbon and the web being printed upon, the pressure member being a rotary platen.

A salient feature of the invention lies in its capability to effect printing of extremely high quality at a high rate of speed. The transfer ribbon employed is of the type which provides substantially 100% transfer of the coating on the ribbon to the web being printed upon. The ribbon thus cannot be reused, and the apparatus of this invention is directed to advancing the ribbon only for the amount of print that actually takes place, while the web is advanced fully to the next printing position. Further, the ribbon is advanced during the printing operation at the same speed as the web, but during the remaining portion of the print cycle, the ribbon is moved to bring a new unused portion into the correct position to print in the next cycle. In the meantime, the web may have moved many times this distance.

In the fashion described, the ribbon is substantially all used line by line. To accomplish these objects, the mechanism provided may be described as a trapeze or a frame having one fixed side and three pin-connected slides. The ribbon is advanced from the fixed side of the frame entirely around the three pin-connected sides. The ribbon itself, and its movements, is always controlled and is kept in a taut condition. The side of the trapeze opposite the fixed side is actuated, for example by cams, to advance the ribbon at web speed as the printing member comes in contact with the ribbon. During the remaining cycle until the next line to be printed by the ribbon advances to the printing position, the trapeze free link is returned in the opposite direction to be ready to advance the ribbon to the next printing line cycle. The ribbon feed roll and take-up roll may be driven constantly to advance the ribbon one line for each line of printing being transferred to the web.

Since the ribbon is always maintained in a taut condition around the frame, the ribbon may be moved very rapidly, and the mechanism is suited to a very high speed rotary press operation. By utilizing a magnetic transfer ribbon in which the coating is entirely transferred to the web being printed, a uniform impression is obtained whether the transfer occurs at only a few per minute or in excess of 1000 impressions per minute.

The invention will be described with respect to a wide ribbon in which the ribbon is as wide as the width of the line being printed. In this arrangement, the ribbon is moved at right angles to the direction of the long dimension of the type. It should be understood, however, that a narrow ribbon may be employed with the same mechanism, in which case the ribbon moves in the direction of the length of the line, and must be advanced during each printing cycle to present an unusld section of ribbon as long as the type which is to be printed.

The mechanism of the invention will now be more particularly described in conjunction with the accompanying drawings, in which.

Figure 1:
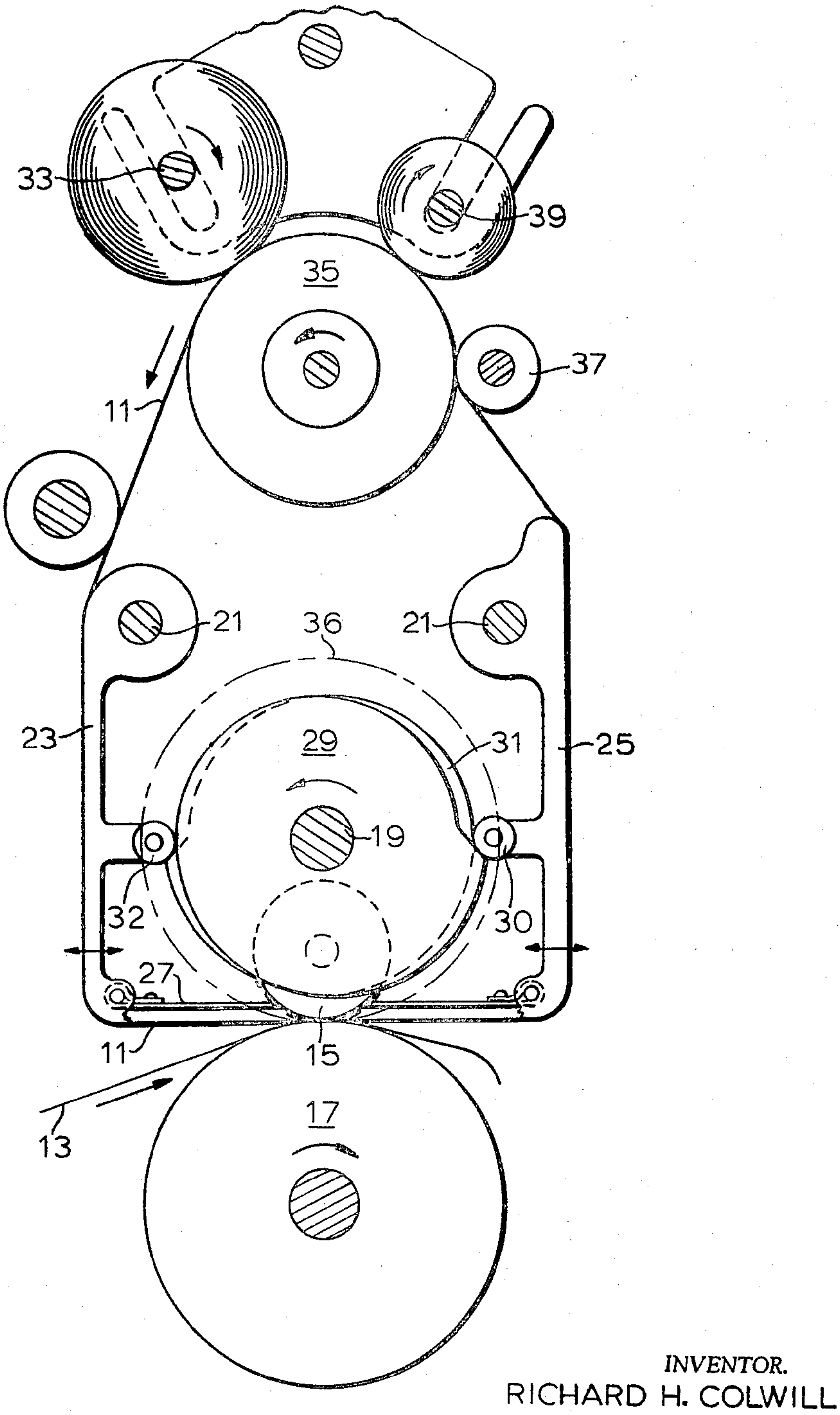
FIG. 1 is a side elevation of a printing apparatus in accordance with the invention.

Referring now to FIG. 1, a rotary ribbon-printing apparatus utilizes a transfer ribbon 11 in which coating material is transferred from the face of the ribbon 11 to a document or a moving web 13. A printing member 15, which may be, for example, type or an engraved wheel as illustrated by the wheel 15 of FIG. 1, forms a printing couple together with a platen 17. The print member 15 is secured to a rotary shaft 19, and rotates about the center of the shaft 19. When the print member 15 engages the moving web 13, the transfer coating is offset from the ribbon 11 through the agency of the pressure applied by the platen 17. In the embodiment of the apparatus being described in conjunction with this figure, steel print members 15 and a steel platen 17 were used for magnetic ink encoding. The ribbon 11 and the web 13 were the only resilient members in the printing operation, in contradistinction to the usual letter press situation, where the platen is of resilient material or has a coating of resilient or compressible material.

At the instant that the print member 15 is in contact with the ribbon, the ribbon 11, the web 13, and the platen 17 are all going in the same direction as the print member and at the same speed. The print member 15 rotates about its shaft 19 with a smooth rotary motion, as does the platen 17. A convenient way of securing the smooth rotary motion of these two members is by means of gearing, in which the pitch circle corresponds in each case to the circle described by the print member 15 and the surface of the platen 17.

The ribbon 11 moves in an intermittent fashion. In the arrangement shown in FIG. 1, the ribbon 11 is carried on a trapeze-like frame. The trapeze has two fixed corners or pivot points 21. Depending from the two corner pivot points 21 are two side members 23 and 25 which carry the ribbon 11 completely around the outside of the frame. A spacer or tension member 27 is used to connect the two side members 23 and 25. Two cams 29 and 31 are employed to drive the trapeze-like frame. Cam 29 cooperates with cam follower 30 to urge the trapeze frame to the right. Cam 31 is complementary to cam 29 and through the agency of cam follower 32 acts to urge the frame 23, 25, 27 to the left. Both of these cams 29 and 31 may be affixed to the shaft 19. The shape of the cams 29 and 31 is chosen to impart a quick motion in the direction of movement of the web (to the right) in FIG. 1 at the time when the print member 15 comes in contact with the ribbon, web and platen. After this short cycle of very fast movement to the right, the cams 29, 31 cause the trapeze frame to return at a slower rate to the left to be ready to provide another fast cycle.

The ribbon 11 is being advanced around the trapeze at a regular smooth rate sufficient to bring a new area of transfer ribbon 11 into position for each line of print. In the arrangement shown in FIG. 1, only a single printing member is illustrated. The cams 29 and 31 therefore only have one high speed ramping surface. If additional print members are positioned about the shaft 19, different cams 29, 31 would be used to provide the proper intermittent motion, one high speed ramp for each print member so employed.

The ribbon feed mechanism comprises a supply reel 33 which is rolled in contact with a feed roll 35. The ribbon 11 then goes around the three-sided frame or trapeze 25, 27 and between a pressure roll 37 and the feed roll 35 to a take-up roll 39. By using the feed roll 35 to unwind the ribbon 11 from the supply roll 33 and to wind up the ribbon onto the take-up roll 39, the ribbon 11 is maintained under even tension and loops and slack do not become a problem.

The feed roll 35 is rotated by means of intermediate gearing at a rate sufficient to move the ribbon 11 slightly more than one line width for each line printed. Therefore, if a number of printing members 15 are distributed around the center of the shaft 19, the feed roll 35 will be driven at a faster rate, and the cams 29, 31 will also have properly shaped surfaces to put the trapeze in motion in the direction of movement of the web at the speed of the web 13 so that the print member 15, the ribbon 11 and the web 13 are all moving at the same speed and in the same direction.

The print member 15 rotates about the shaft 19 and thereby describes the printing circumference 36. During the time when the print member 15 is not adjacent to the platen 17, the ribbon 11 clears the paper web 13 and the platen 17 by a few thousandths of an inch. This prevents the ribbon 11 from offsetting to the web 13, which may be moving at several hundred feet per minute. The print member 15, when it advances into printing position, then moves the transfer ribbon 11 out from the trapeze member 27 by the few thousandths of an inch necessary to contact the high speed web.

Figure 2:
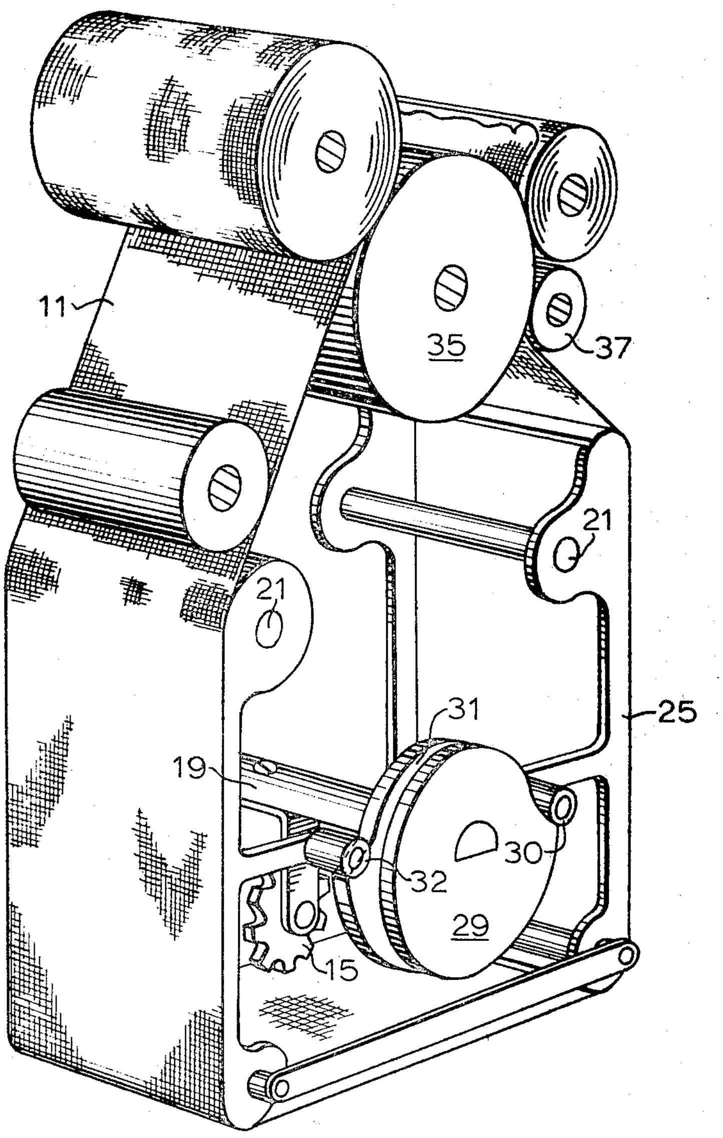
FIG. 2 is a perspective view of the apparatus shown in FIG. 1 illustrating a single printing character wheel employed in a rotary printing operation.

Referring now to FIG. 2, the relationship of the various parts of the apparatus shown in FIG. 1 can be readily understood from a study of the perspective.

The transfer ribbon 11 is maintained under controlled tension from being unwound from the supply roll 33, entirely around the trapeze 23, 25, 27 and back to the take-up roll 39. Because of the construction of the trapeze around which the ribbon 11 passes, it is not necessary to feed the ribbon intermittently from the supply reel. Accordingly, the feed roll 35 advances at a steady rate and the entire ribbon 11 advances smoothly, while the bottom of the trapeze moves at the rate that the printing member 15 moves, at the time of impact of the printing member with the platen 17.

Figure 3:
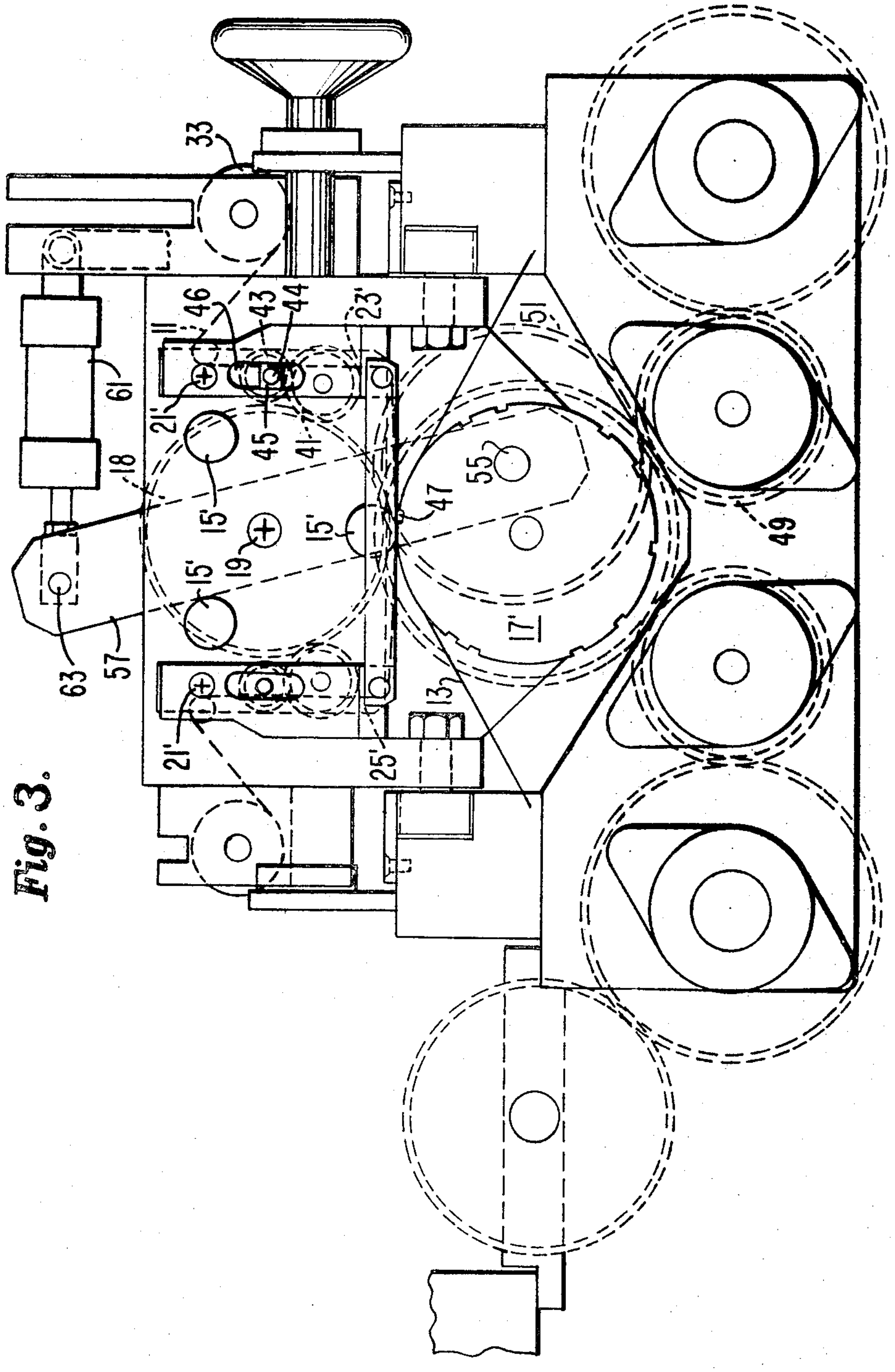
FIG. 3 is a side elevation of a three-head high speed rotary print unit in accordance with the present invention.

Referring now to FIG. 3, there is shown a high speed rotary ribbon printer which utilizes the ribbon control and advance mechanism in accordance with this invention. The ribbon 11 is fed from a supply roll 33 around a trapeze having two fixed pivots 21'. The side frames 23', 25' are actuated from the rotary member 18 which carried three print members 15' around the periphery thereof. An intermediate gear 41 is in mesh with gear teeth on the outside of the rotary member 18 and drives a gear 43 which has an eccentric shaft 44 extending into a journal block 45. The journal block 45 rides in a slot 46 in one of the side frames 23' and provides positive 2-direction camming action to the trapeze as the gear 43 is rotated. As the eccentric shaft 44 rotates around the center of gear 43, the journal block, and consequently the side frame 23', will be oscillated back and forth at a rate with respect to the rotary member 18 which depends upon the ratio of the diameters of the rotary member 18 to the gear 43.

The embodiment of FIG. 3 illustrates a throw-off mechanism which can be utilized in a high speed rotary printing operation. A letterpress printing operation takes place, whether with inked type or with type in combination with a transfer ribbon, when a print member 15' transfers ink to a web 13 by means of a printing couple established between the print member 15' and a platen 17'. Throw-off means commonly operate by changing the axis of rotation of either the platen or the print member with respect to the other.

The high speed rotary printing device being described is especially suited for printing a single line, for example, magnetic ink encoding for bank checks and similar documents which are to be read by magnetic ink character recognition equipment. To relieve the pressure couple between the printing member 15' and the platen 17' and thus to disable the printing of thesingle line per document, this invention utilizes a throw-off mechanism which shifts the registration between the platen 17' and the print member 15 by one line into a position where the print member does not meet a solid surface at the proper distance to force the print member 15' and the web 13 together. In the throw-off condition, a slot 47 is provided in platen 17' opposite the print member 15' in what would be the pressure position.

The drive for the printing cylinder 18, and the print members 15', is obtained from a drive gear 49 through an intermediate gear 51 and the print member gear 53 which is secured to and operates print member 18. The intermediate gear 51 has its axle 55 carried by a lever arm 57 which is pivoted around the center of revolution of shaft 19 of the printing cylinder 18. Should a throw-off condition be required, for example, because of a break in theweb, mis-registration, or for a similar reason, the lever arm 57 is rotated about its pivot point 19 a sufficient amount to move the axle 55 half of the distance it is desired to move the print member 15' with respect to the slot 47.

Figures 4, 5:
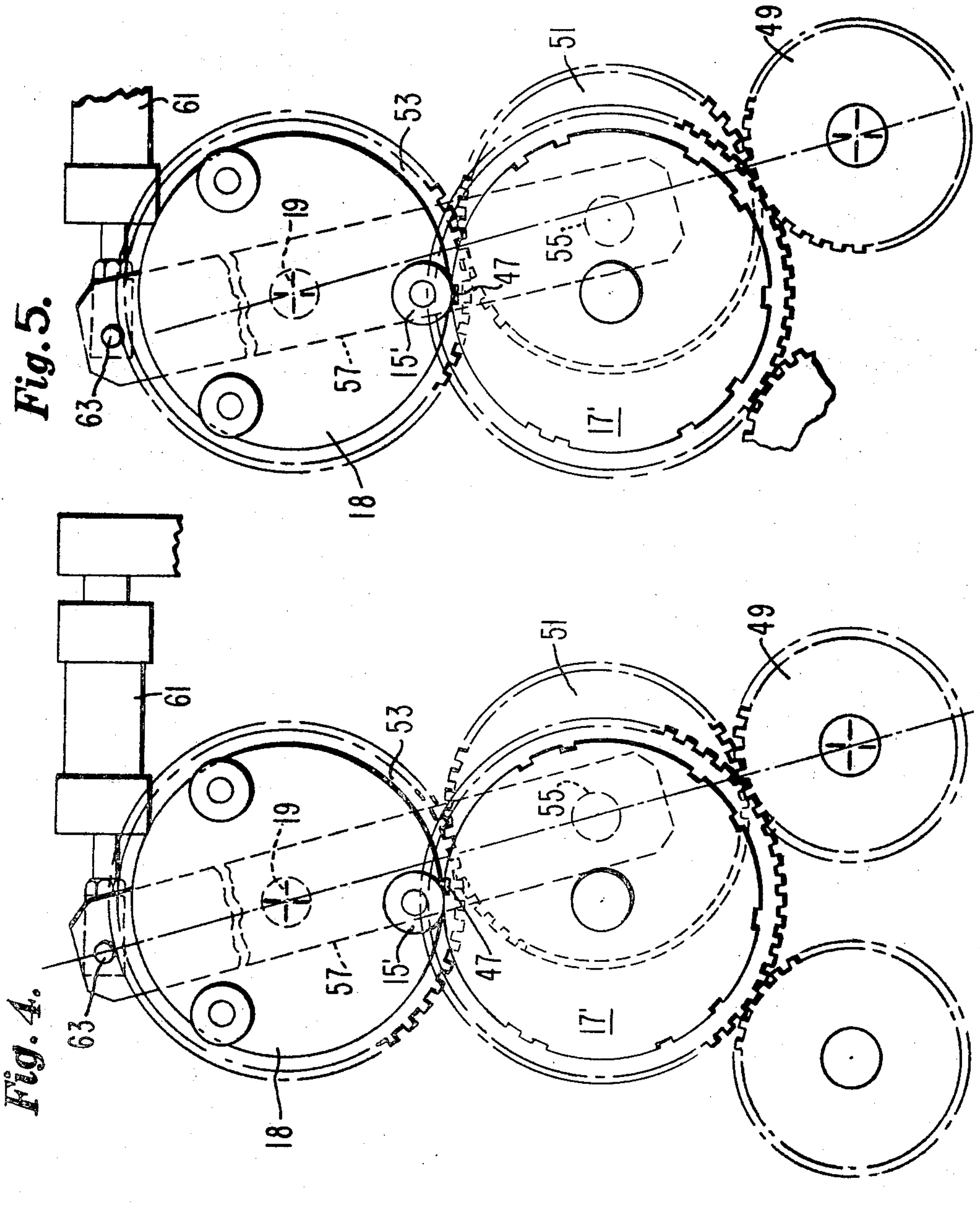
FIGS. 4 and 5 are illustrations of a novel throw-off mechanism employed in the rotary printer of this invention.

The normal running condition of the drive members, the intermediate gearing and the lever arm 57 is illustrated in FIG. 4, which figure contains all of the reference numerals used in the description of the operation of the throw-off mechanism.

FIG. 5 illustrates the condition of the parts illustrated in FIGS. 3 and 4 but with the throw-off mechanism actuated to relieve the pressure between the print member 15' and the platen 17'. The lever arm 57 is shown in a position in FIG. 5 shifted clockwise about the shaft 19. Since gear 51 is in mesh with the drive gear 49, the opposite side of gear 51 which is in mesh with the gear teeth 53 driving the gear member 18 rotates counterclockwise by twice the distance that the axle 55 is shifted. This rotation is transferred through the gear 53 to cause the print member 15' to rotate clockwise and bring the print member 15' opposite the slot 47 at the time when pressure would ordinarily be exerted by the platen against the print member 15'.

The control of the throw-off mechanism may be by means of a solenoid 61 or equivalent electromagnetic or pneumatic operating member linked to the lever arm 57 by means of a pin connection 63.

I claim:

1. A rotary ribbon printer comprising a rotary print member and a rotary platen cooperating therewith, a pin-connected frame of more than three sides having two corners of said frame fixed with respect tosaid print member, one side of said frame lying substantially along the line of contact between said print member and said platen, means to oscillate said one side of said frame in the direction of movement of said print member for a short distance corresponding to a desired amount of printing and to return said frame said short distance, and a transfer ribbon guided about said pin-connected frame and under slight tension, whereby said transfer ribbon moves together with said frame, and means to advance said transfer ribbon continuously and smoothly around said frame.

2. The combination as defined in claim 1 wherein said one side of said frame is moved in the direction of print at substantially the same speed as said rotary print member along the line of contact during the time of contact.

3. The combination as defined in claim 1 wherein said one side of said frame is tangential to said print member and said platen, and said one side is oscillated in the direction of movement of the print member at substantially the tangential velocity of the print member at the time of encountering said platen, and wherein said return movement is at a different velocity.

4. The combination as defined in claim 1 wherein said one side of said frame is moved along said line of contact at a speed so that said transfer ribbon has a velocity along said line of contact the same as said print member at the time said print member is opposite said platen to accomplish transfer.

References Cited

UNITED STATES PATENTS

| | | | |
|---|---|---|---|
| 1,949,362 | 2/1934 | Wickwire et al. | 101—244 XR |
| 2,714,268 | 8/1955 | Battey | 101—244 |
| 2,758,541 | 8/1956 | Tison | 101—228 |

WILLIAM B. PENN, *Primary Examiner.*

J. R. FISHER, *Assistant Examiner.*